(12) United States Patent
Hong et al.

(10) Patent No.: US 8,406,915 B2
(45) Date of Patent: Mar. 26, 2013

(54) MOBILE RACK FOR A LIBRARY AND RFID SYSTEM FOR A LIBRARY INCLUDING THE SAME

(75) Inventors: Jin Kuk Hong, Hwaseong (KR); Jae Yul Choo, Yongin (KR); Jeong Ki Ryoo, Daejeon (KR)

(73) Assignee: LS Industrial Systems Co., Ltd., Anyang-Si, Gyeonggi-Do (KR)

( * ) Notice: Subject to any disclaimer, the term of this patent is extended or adjusted under 35 U.S.C. 154(b) by 419 days.

(21) Appl. No.: 12/730,937

(22) Filed: Mar. 24, 2010

(65) Prior Publication Data

US 2010/0249987 A1    Sep. 30, 2010

(30) Foreign Application Priority Data

Mar. 27, 2009 (KR) .................. 10-2009-0026631

(51) Int. Cl.
*G06F 7/00* (2006.01)
*G06F 17/00* (2006.01)
*A47B 53/00* (2006.01)
*A47F 3/08* (2006.01)

(52) U.S. Cl. ........ 700/215; 700/213; 700/214; 700/241; 700/217; 700/232; 700/244; 312/198; 312/199; 312/200; 211/1.57

(58) Field of Classification Search .................. None
See application file for complete search history.

(56) References Cited

U.S. PATENT DOCUMENTS

| | | | |
|---|---|---|---|
| 5,636,750 A * | 6/1997 | Heyl | 211/1.57 |
| 6,595,418 B1 * | 7/2003 | Igarashi et al. | 235/385 |
| 2006/0102718 A1 | 5/2006 | Kajino et al. | |

FOREIGN PATENT DOCUMENTS

| | | |
|---|---|---|
| CN | 2754449 | 2/2006 |
| CN | 101359767 | 2/2009 |
| GB | 2419722 | 5/2006 |
| JP | 2005-352951 | 12/2005 |
| JP | 2006-124123 | 5/2006 |
| JP | 2006-256856 | 9/2006 |
| JP | 2006-341985 | 12/2006 |
| KR | 1020030023663 | 3/2003 |
| KR | 100814456 | 3/2008 |

OTHER PUBLICATIONS

State Intellectual Property Office of the People's Republic of China Application Serial No. 201010140334.0, Office Action dated Dec. 17, 2012, 7 pages.

* cited by examiner

*Primary Examiner* — Gene Crawford
*Assistant Examiner* — Yolanda Jones
(74) *Attorney, Agent, or Firm* — Lee, Hong, Degerman, Kang & Waimey

(57) ABSTRACT

The present disclosure relates to a mobile rack for a library and an RFID (Radio Frequency Identification) system for a library including the same, wherein the mobile rack includes a plurality of racks configured to keep books each attached with an RFID tag and mounted with an RFID reader for recognizing tag information stored in the RFID tag, a moving unit configured to move at least one of the plurality of racks, a server configured to manage the books that are inputted, outputted and stacked, and a controller configured to control the moving means in response to a user command through the server or the tag information and to adjust a discrete distance between racks.

12 Claims, 7 Drawing Sheets

MOBILE RACK FOR A LIBRARY AND RFID SYSTEM FOR A LIBRARY INCLUDING THE SAME

Pursuant to 35 U.S.C. §119 (a), this application claims the benefit of earlier filing date and right of priority to Korean Patent Application No. 10-2009-0026631, filed on Mar. 27, 2009, the contents of which are hereby incorporated by reference in their entirety.

BACKGROUND OF THE DISCLOSURE

1. Field

The present disclosure relates to a mobile rack for a library and an RFID (Radio Frequency IDentification) system for a library including the same, and more particularly to a mobile rack for a library and an RFID system for a library including the same, in which an RFID communication using UHF is employed, and security and ambient space utilization can be beneficially obtained by moving racks containing books.

2. Background

Generally, a library mobile rack is installed at a place where lots of books are stored or kept such as a library, and configured to move racks in various shapes and structures. These days, an RFID (Radio Frequency IDentification) communication is utilized to effectively manage the books in the library moving racks.

The above RFID is a technology to receive and transmit data from an electronic tag attached to objects by using radio frequency. That is, the RFID is a technology that uses radio frequencies to transmit/receive information to/from an electronic tag attached to an object, thereby providing a related service during the sale of the object. The RFID can be thought of as a representative technology of general contact-less cards that can replace barcodes, magnetic cards, IC cards, and the like.

The operating principle of the RFID system is as follows. AN RFID system includes an RFID reader and an RFID tag. The RFID reader includes an internal or external antenna forming an electromagnetic field, that is, RF field by diffusing an active signal. If the electronic tag enters the RF field, the electronic tag receives the active signal diffused by the antenna and transmits data stored at a tag to the RFID reader by using the received active signal. After this, the RFID reader receives and analyzes the data transmitted by the electronic tag to acquire particular data on an object where the electronic tag is attached.

That is to say, an RFID system includes an RFID reader and an RFID tag. The RFID reader emits an active signal through an antenna to create an electromagnetic field, that is, an RF field. Upon entering the RF field, the RFID tag is enabled. In response to a reader request signal transmitted from the RFID reader, the enabled RFID tag transmits its stored information (or a tag response signal) to the RFID reader. Upon receiving the information from the RFID tag, the RFID reader analyzes the received information to obtain the specific information relating to an object to which the RFID tag is attached.

Meanwhile, an RFID system uses various frequency bands such as low frequency, high frequency, UHF, microwave, having different usages and practical uses respectively. However, frequencies generally used by the RFID communication include low frequencies (125 kHz, 135 kHz) and high frequencies (13.56 MHz), whereby an interference signal is transmitted to the antenna. The interference signal brings about an inconvenience to management of objects attached with the RFID tag.

Particularly, many signals may be overlappingly received by the antenna to increase inconveniences to the management of books caused by the interfered signals in a library mobile rack where a plurality of racks stacked with many books is installed and where each rack is movably provided.

SUMMARY

The present disclosure is disclosed to obviate the above-mentioned disadvantages, and it is an object of the present disclosure to provide a mobile rack for a library and an RFID (Radio Frequency IDentification) system for a library including the same, whereby, an RFID communication is enabled to allow an easy management of books even if racks for keeping books are disposed at adjacent areas.

The present disclosure also enables movement of racks to provide an advantage to security and ambient space utilization.

However, it should be understood that the above details regarding mobile rack for a library and an RFID (Radio Frequency IDentification) system for a library including the same are illustrative in nature as the disclosure may be modified and practiced in different but equivalent manners apparent to those skilled in the art having the benefit of the teachings herein. Thus, the present disclosure should not be limited to such details unless they are specifically set forth in the appended claims.

In one general aspect of the present disclosure, a mobile rack for a library comprises: a plurality of racks configured to keep books each attached with an RFID tag and mounted with an RFID reader for recognizing tag information stored in the RFID tag; moving means configured to move at least one of the plurality of racks; a server configured to manage the books that are inputted, outputted and stacked; and a controller configured to control the moving means in response to a user command through the server or the tag information and to adjust a discrete distance between racks.

In some exemplary embodiments, the plurality of racks may include a first rack and a second rack, and the controller may control the moving means to allow the first and second racks to be locked while being approached in response to the tag information in the books stacked in the first rack or the second rack, or the user command.

In some exemplary embodiments, the controller may release the locking between the first and second racks in response to the tag information in the books stacked in the first rack or the second rack, or the user command, and separate the first and second racks, whereby the moving means may be controlled to open and unfold the first and second racks.

In some exemplary embodiments, the mobile rack may be provided with an UHF antenna configured to transmit an radio frequency (RF) signal of UHF band generated by the RFID reader and transmit the RF signal to the RFID reader by receiving the RF signal of UHF band transmitted by the RFID tag, and provided with a plurality of divisional plates configured to keep the books by dividing the racks, wherein each of the divisional plates is provided with the UHF antenna to divide a stacking area of books through the server.

In some exemplary embodiments, the mobile rack may further comprise an obstacle detecting sensor configured to detect whether there is any obstacle between the first and second racks and to transmit obstacle detection information to the controller.

In some exemplary embodiments, the controller may stop the operation of the moving means if the obstacle detection information is received from the obstacle detection sensor that there is an obstacle between the first and second racks.

In some exemplary embodiments, the mobile rack may further comprise a display configured to display at least one of the tag information, the user command and the obstacle detection information.

In another general aspect of the present disclosure, a mobile rack for a library comprises: a plurality of racks configured to keep books each attached with an RFID tag and mounted with an RFID reader for recognizing tag information stored in the RFID tag; moving means configured to move at least one of the plurality of racks; a server configured to manage the books that are inputted, outputted and stacked; and a locking device configured to lock the two adjacent racks while the two adjacent racks are mutually approached in response to a user command through the server or the tag information.

In some exemplary embodiments, the locking device may release the lock-up in response to a user command through the server or the tag information whereby a space between the two adjacent racks can be opened.

The mobile rack for a library and an RFID (Radio Frequency IDentification) system for a library including the same according to the present disclosure is advantageous in that the use of RFID communication using the UHF band enables the book management using the RFID communication without being affected by interference signal even if racks configured to keep books are provided in plural form.

Another advantage is that security of books can be maintained because the racks are locked up by being moved in adjacent manner.

Still another advantage is that a space between a space of each rack is opened to allow books to be taken out, where the obstacle detection sensor is used to guarantee the security of a user taking out a book.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description, serve to explain the principle of the disclosure. In the drawings.

DETAILED DESCRIPTION

Figure 1:
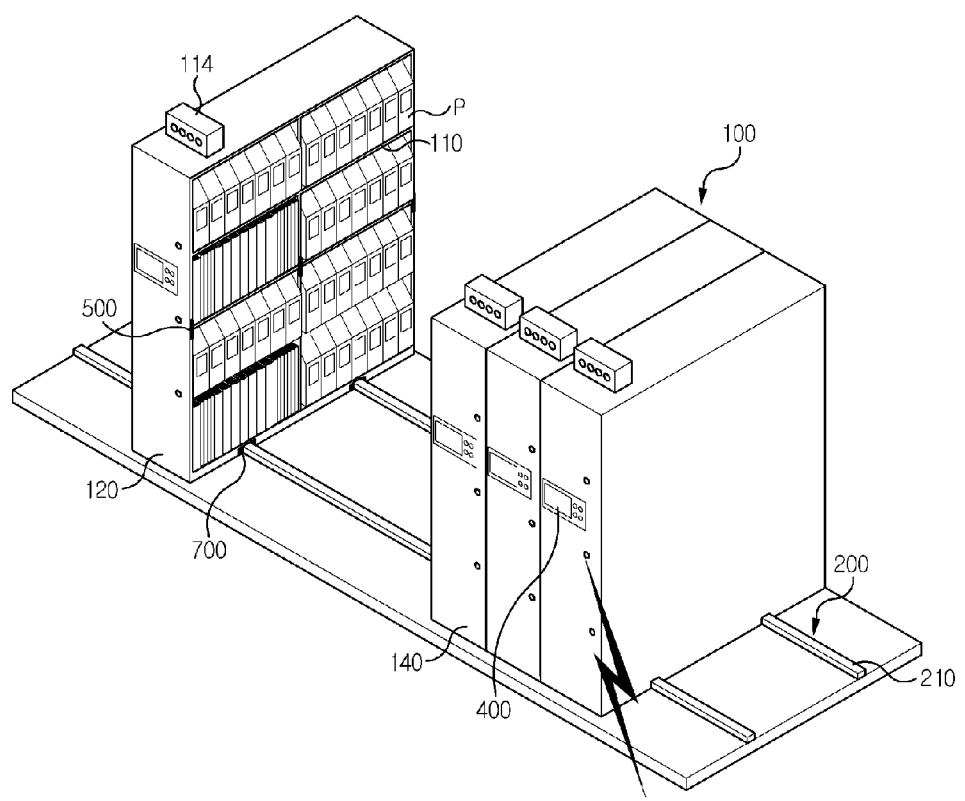
FIG. 1 is a perspective view illustrating a mobile rack for a library according to an exemplary embodiment of the present disclosure.
Figure 1:
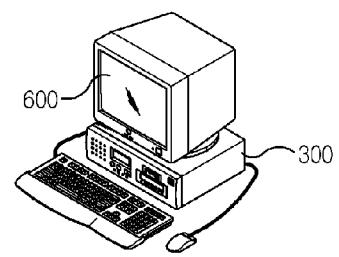

Hereinafter, exemplary embodiments of the present disclosure are described in detail with reference to the accompanying drawings. Detailed descriptions of well-known functions, configurations or constructions are omitted for brevity and clarity so as not to obscure the description of the present disclosure with unnecessary detail. In the drawings, the size and relative sizes of constituent elements may be exaggerated for clarity. The same reference numerals will be assigned to the same elements in the explanation of the figures.

Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Figure 2:
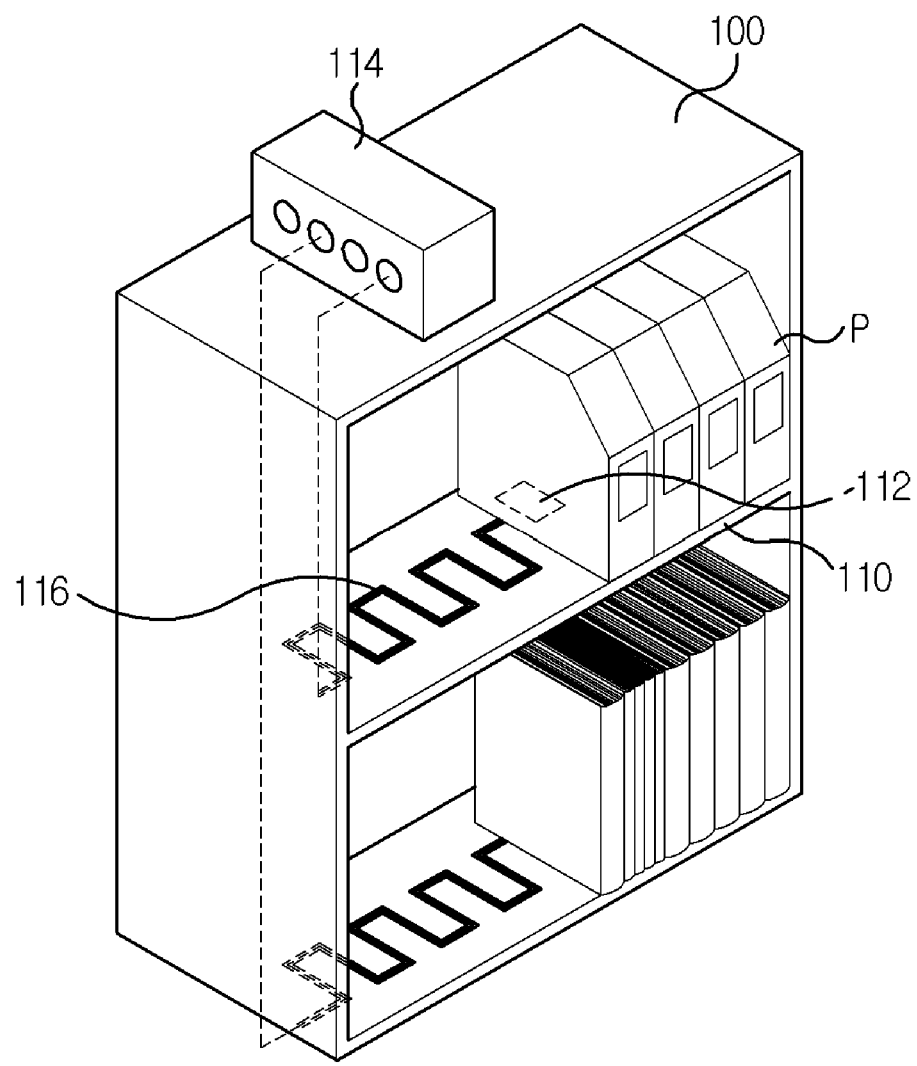
FIG. 2 is an enlarged perspective view illustrating a rack of a mobile rack for a library according to an exemplary embodiment of the present disclosure.

FIG. 1 is a perspective view illustrating a mobile rack for a library according to an exemplary embodiment of the present disclosure, and FIG. 2 is an enlarged perspective view illustrating a rack of a mobile rack for a library according to an exemplary embodiment of the present disclosure.

Referring to FIGS. 1 and 2, a mobile rack for a library may include a rack 100, moving means 200, a server 300 and a controller 400. The rack 100 serves to keep the books each attached with an RFID tag 112, and may be provided with a plurality of divisional plates 110 configured to divide the racks 100 so that the books (P) can be easily stored. At this time, other items placeable on the racks 100 may be included. The rack 100 may be provided with an RFID reader 114 configured to recognize tag information recorded with in an RFID tag 112 attached to the book (P). The RFID reader 114 may be connected to an UHF antenna 116.

The UHF antenna 116 serves to transmit a radio frequency (RF) signal of UHF band generated by the RFID reader 114 and to transmit the RF signal to the RFID reader 114 by receiving the RF signal of UHF band transmitted by the RFID tag 112.

The UHF antenna 116 employing a near-field generates no interference with other antennas provided in other divisional plates, and has a high recognition speed and recognition rate over that of an HF antenna. The disadvantage of the UHF antenna is that it has a shorter recognition distance over that of the HF antenna. However, the UHF antenna has no problem when it comes to a short discrete distance between the RFID tag and the antenna as in the mobile racks for a library according to the present disclosure.

That is, although separate means must be installed for preventing the interference phenomenon with other antennas disposed in other divisional plates if the UHF antenna is not used, the usage of the UHF antenna can dispense with the inconvenience.

The UHF antenna is mounted at each divisional plate 110 to check at which divisional plate a book (P) is stacked. That is, the usage of the UHF antenna enables a user to discern a stacked area of a book via the server. Furthermore, the UHF antenna can also correct the tag information collected in the RFID tag by receiving a recorded signal from the RFID reader 114. That is to say, in a case information correction on a book (P) is needed, the information correction of the book is possible without taking out the book that is stacked. The UHF antenna may be also used to additionally input security information on the book (P) or to delete the security information inputted into the book (P).

Meanwhile, the moving means 200 serves to move at least one of the plurality of racks 100, and may include a rail 210, a wheel (not shown) rotating along the rail 210, and a motor (not shown) driving the wheel. That is, the rack 100 may be mounted at a bottom surface thereof with the wheel and the motor, and the rack 100 may be moved by control of the motor by the controller 400 (to be described later).

The server 300 functions to manage the in/out and stacking of books (P) on the rack 100, and may be provided to be able to communicate with the RFID reader 114 wirelessly or wiredly. That is, the server 300 receives the information of the books (P) through the RFID communication and transmits the information to a user, and the user having received the information uses the information to manage the in/out and stacking of the books (P). The server 300 is also connected to the controller 400 to be explained later.

The user therefore can use the server 300 to transmit a command to the controller 400. As noted above, in a case the controller 400 is provided with the user command, the controller 400 may control the moving means 200 to cause the rack 100 stacked with a book (P) sought after by the user to be moved. The server 300 is also connected to a display 600 (to be explained later) to allow the information of the book (P) desired by the user to be managed in real time. This real time management of books provides an advantage to a case where in/out of books (P) is frequent.

Meanwhile, the controller 400 may control the moving means 200 responsive to the user command via the server 300 or the tag information to adjust each discrete distance of the racks 100.

That is, the controller 400 may receive information on the kinds of books (P) and security problems of the books (P) from the tag information recognized via the RFID reader 114, or receive via the server 300 the user command of whether to open or close the racks 100 and what kind of book desired by the user is. In a case the controller 400 receives the user command or the tag information, the controller 400 controls the moving means 200 to arrange the racks 100 in the following manner.

First, assuming that two oppositely-laid racks are called a first rack 120 and a second rack 140, the controller 400 may control the moving means 200 in such a fashion that the first and second racks 120, 140 are mutually approached. That is, the controller 400 may control in such a manner that a discrete distance between the two racks is narrowed. At this time, racks not facing one another and located in the right hand side and in the left hand side of the first and second racks 120, 140 may be simultaneously moved.

Once the first and second racks 120, 140 are mutually approached, the controller 400 may check whether the books (P) stacked inside the two racks need to be security-maintained according to the tag information of the books or the user command, and may control in such a manner that the two racks are locked. At this time, the controller 400 may lock up the two racks by turning off the motor mounted at the moving means 200 or by applying a brake to the wheel. Alternatively, the controller 400 may lock up the two racks by controlling a locking device 700 separately provided at the bottom of the rack 100.

Meanwhile, the controller 400 may control the moving means 200 in such a manner that the first rack 120 is distanced from the second rack 140 or vice versa. That is, the controller 400 controls in such a way that the discrete distance between the two racks is increased. Prior to the first rack 120 and the second rack 140 being opened to a wider width, the lock-up of the two racks must be released. The release of the lock-up may be determined by the tag information of the book (P) or the user command.

That is, in a case a tag information is transmitted that the security validity of the book (P) has been terminated via the RFID reader 114, or a user command is inputted that the user has released the security of the book via the server 300, the controller 400 may turn on the motor or release the brake of the wheel to release the lock-up of the two racks.

As mentioned above, in a case the lock-up of the two racks is released, and the distance or gap between the two racks is widened, the user may take out a book stacked on one of the two racks.

At this time, the user may be hurt in the midst of taking out the book if the two opened racks are closed, such that it is preferable that an obstacle detection sensor 500 be provided to detect whether there is an obstacle (B) between the first and second racks 120, 140. The obstacle detection sensor 500 may be mounted at a lateral surface of the first rack 120 and the second rack 140, or at an upper side and a lower side of the first rack 120 and the second rack 140. The obstacle detection sensor 500 may be conventionally a proximity sensor. The obstacle detection sensor 500 is not limited to the proximity sensor but may be an ultrasonic sensor, an ultrasonic sensor or any other type of sensor.

The obstacle detection sensor 500 transmits the detected obstacle detection information to the controller 400. The controller 400 in turn stops the operation of the moving means 200 to prevent the two opened racks from being closed again if the controller 400 receives the detected obstacle detection information.

In addition, there may be provided between the first rack 120 and the second rack 140 a safety device configured to forcibly stop the operation of the moving means 200 if the obstacle detection sensor 500 fails to properly operate.

A mobile rack for a library according to an exemplary embodiment of the present disclosure may further include a display 600 that is connected to the RFID reader 114, the server 300 and the controller 400 for displaying at least one of the tag information and the user command or the obstacle detection information. At this time, the server 300 and the display 600 may be implemented by a user personal computer (PC), and the controller 400 may be provided to communicate with the user PC wiredly or wirelessly. This configuration is intended for the user not only to firsthand manipulate the controller and but to manipulate the controller 400 via the server 300 while watching the display at a remote distance.

Now, an operating process of a mobile rack for a library thus configured and an RFID system for a library including the same will be described with reference to FIGS. 3 to 7.

Figure 3:
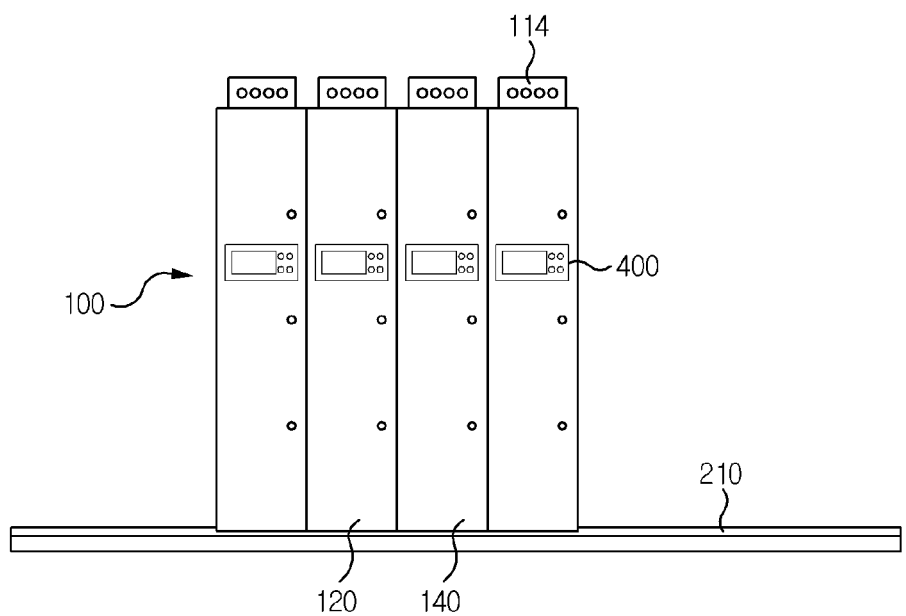
FIG. 3 is a status view illustrating two adjacent racks being locked up according to an exemplary embodiment of the present disclosure.
Figure 4:
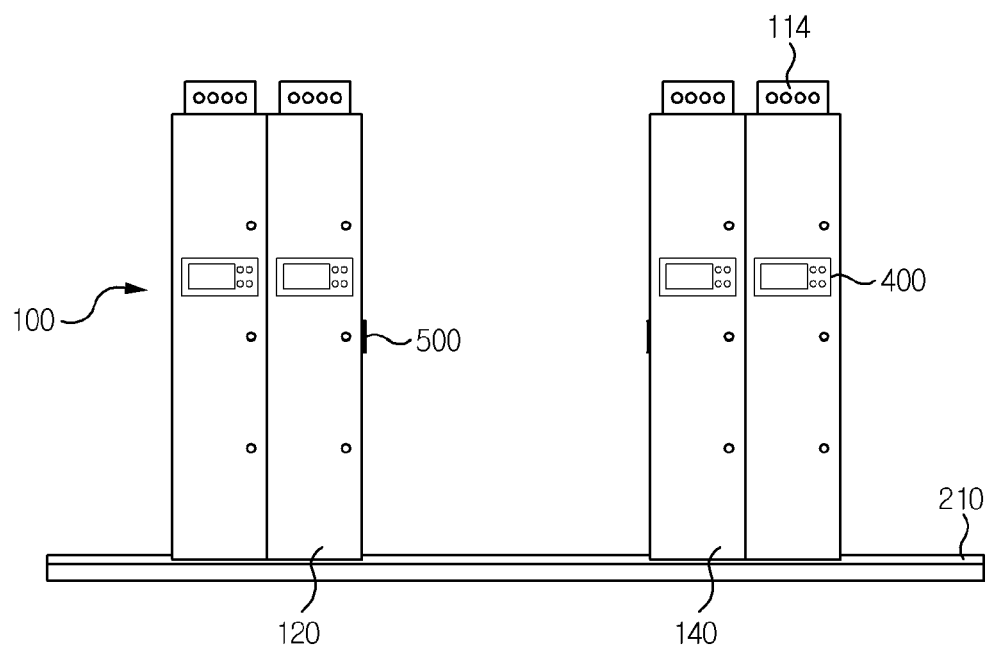
FIG. 4 is a status view illustrating an opened state of two adjacent racks according to an exemplary embodiment of the present disclosure.
Figure 5:
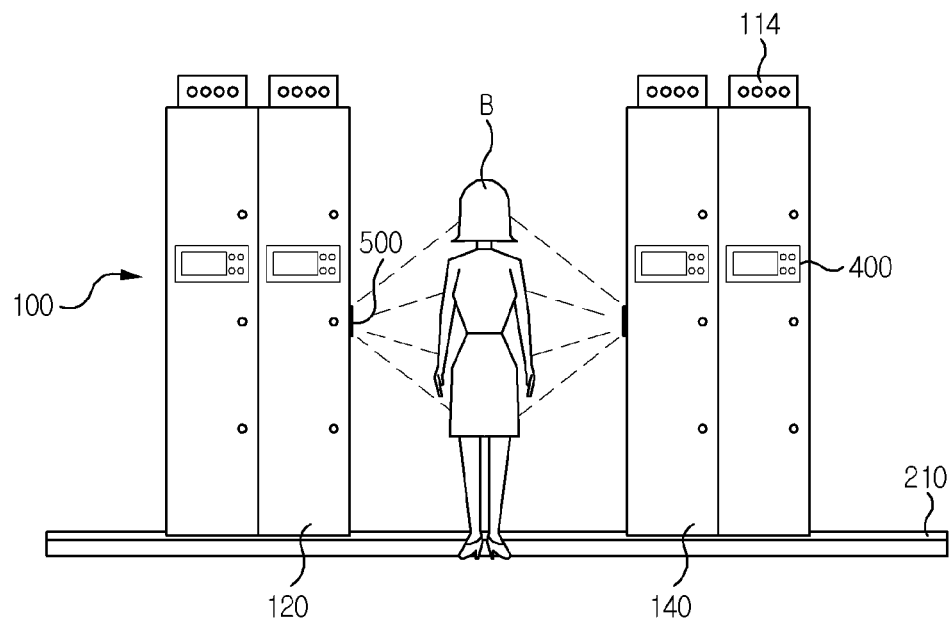
FIG. 5 is an operational status view illustrating an operational process of an obstacle detection sensor in a mobile rack for a library according to an exemplary embodiment of the present disclosure.
Figure 6:
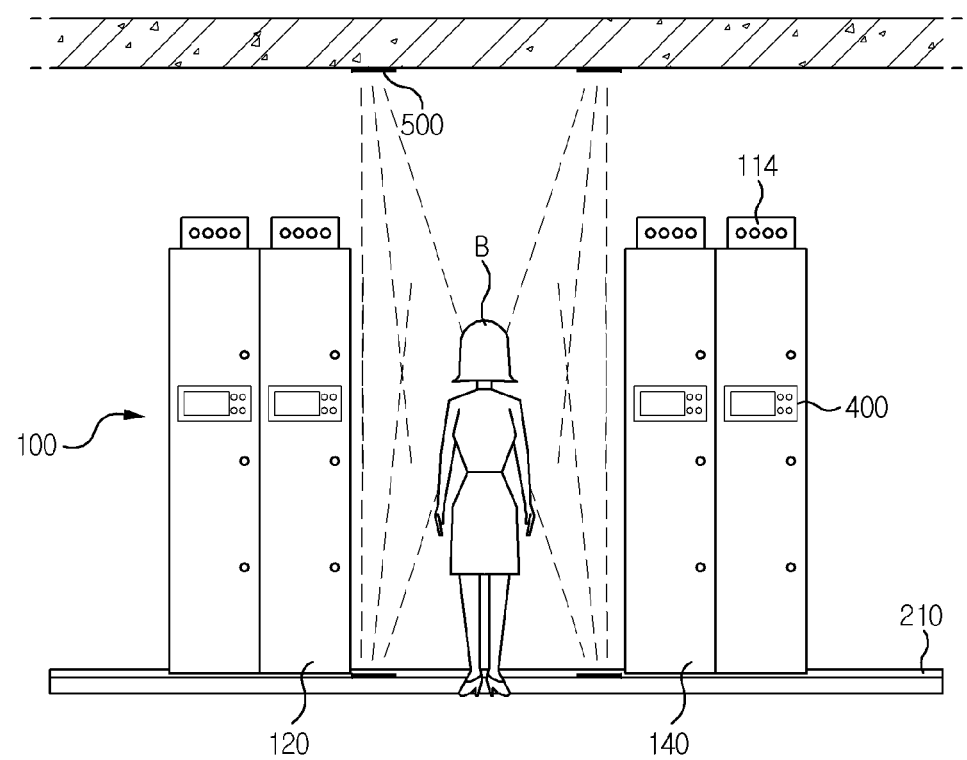
FIG. 6 is an operational status view illustrating an operational process of an obstacle detection sensor in a mobile rack for a library according to another exemplary embodiment of the present disclosure.
Figure 7:
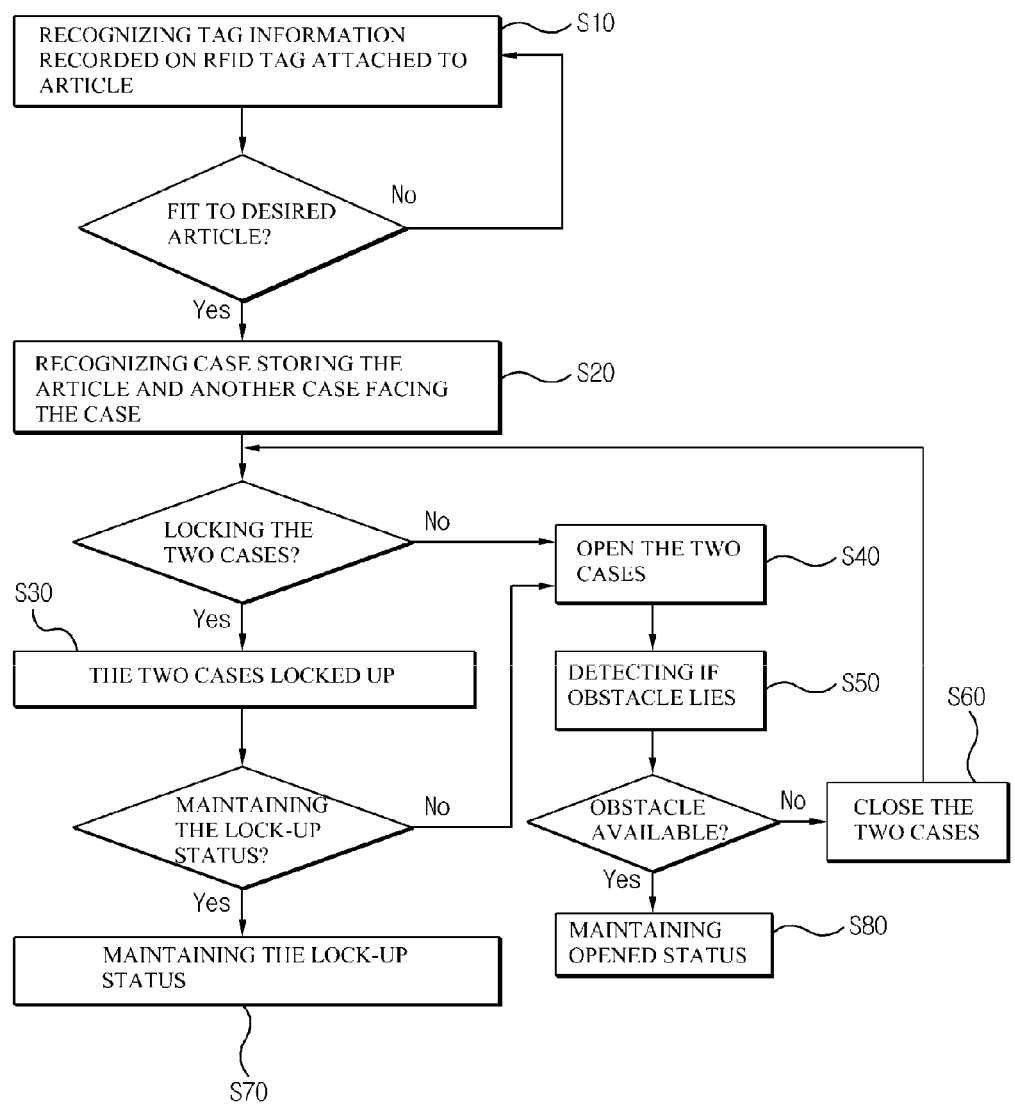
FIG. 7 is a flowchart illustrating an operational process of an RFID system for a library according to the present disclosure.

FIG. 3 is a status view illustrating two adjacent racks being locked up according to the present disclosure, FIG. 4 is a status view illustrating an opened state of two adjacent racks according to the present disclosure, FIG. 5 is an operational status view illustrating an operational process of an obstacle detection sensor in a mobile rack for a library according to the present disclosure, FIG. 6 is an operational status view illustrating an operational process of an obstacle detection sensor in a mobile rack for a library according to another exemplary embodiment of the present disclosure, and FIG. 7 is a flowchart illustrating an operational process of an RFID system for a library according to the present disclosure.

Referring to FIG. 7, information of a book (P) stacked on the divisional plate 110 may be recognized using the UHF antenna 116 and the RFID reader 114 provided underneath the divisional plate 110 dividing the rack 100.

That is, the tag information recorded in the RFID tag 112 attached to the book (P) is collected by the UHF antenna 116, and the collected information is recognized by the RFID reader 114 provided at each rack (S10).

The controller 400 causes the recognized tag information to check if the book selected by the tag information is the right book that the user has selected, and if the book is the right one, the controller 400 recognizes the first rack on which the book is stacked and the second rack 140 that faces the first rack 120 (S20). Alternatively, if the book is not the right one that the user intends to select, the tag information is fed back to the controller 400 to recognize the tag information.

At this time, the tag information and the selected racks may be displayed on the display 600 from which the user may acquire the information on the desired book (P). Successively, the controller 400 may determine whether to lock up the two racks using the tag information per se, or the user who has recognized the information from the display 600 on the desired book (P) may determine whether to lock up the two racks based on the command transmitted from the server 300.

At this time, if it is recorded in the tag information that the desired book (P) needs to be security-maintained, the two racks are made to be locked up. Furthermore, even if the user determines that the desired book (P) must be security-maintained, the two racks are made to be locked up (S30).

In case the two racks are locked up, the controller 400 may control the moving means 200 to shorten the discrete gap between the two racks. At this time, the discrete gap is a distance where the user cannot see or take out the desired book (P) from the first rack 120 but a distance that can be locked up.

Furthermore, following the lock-up of the two racks, the controller 400 repeatedly checks at a predetermined periodical interval whether to maintain the lock-up status, and if there is a need of maintaining the lock-up status, the controller 400 maintains the lock-up status (S70). At this time, the controller 400 also checks the lock-up period based on the tag information or the user command when determining whether to maintain the lock-up status.

Meanwhile, in a case the user is to take out an article from the first rack 120 while the two racks are not locked up, the discrete gap between the two racks is lengthened to open and to widen the two racks (S40). The user then takes out the book after the two racks are widely opened. However, if the two racks are closed, there is a risk of the user being hurt, such that the obstacle detection sensor 600 is used to monitor if there is an obstacle (B) (S50). At this time, if there is an obstacle, i.e., a man, between the two racks, the user maintains the opened status (S80).

However, if there is no obstacle between the two racks, the two racks may be closed (S60). After the two racks are closed, a recheck is made as to whether to lock up the two racks and the user determines whether to lock up the two racks.

As apparent from the foregoing, the racks 100 stacked with a book (P) are moved by the information on the book recognized by using the RFID communication and the user command, whereby the user can easily find the book (P) and a book that needs security-maintenance can be managed.

In addition, as long as a book (P) is not to be taken out, a discrete gap between racks 100 is narrowed to enhance the space availability at an area where the mobile rack for a library is installed.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications, and variations that fall within the scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A mobile rack for a library, the mobile rack comprising:
   a plurality of racks configured to hold books, each of the plurality of racks having an RFID tag attached and having an RFID reader mounted for recognizing tag information stored in the RFID tag;
   moving means configured to move at least one of the plurality of racks;
   a server configured to manage books that are input, output and stacked; and
   a controller configured to control the moving means in response to a user command received via the server or in response to the tag information and to adjust a distance between at least two of the plurality of racks,
   wherein the plurality of racks include at least a first rack and a second rack, and
   wherein the controller is further configured to control the moving means to lock the first and second racks when the at least first and second racks are approached in response to the tag information in the books stacked in at least the first rack or the second rack or in response to the user command.

2. The mobile rack of claim 1, further comprising:
   a UHF antenna configured to transmit a radio frequency (RF) signal of UHF band generated by the RFID reader and to transmit an RF signal of UHF band received from the RFID tag to the RFID reader; and
   a plurality of divisional plates configured to secure the books by dividing the at least first and second racks, each of the divisional plates provided with the UHF antenna in order to divide a stacking area of the books.

3. The mobile rack of claim 1, wherein the controller is further configured to:
   release the locking of the at least first and second racks in response to the tag information in the books stacked in at least the first rack or the second rack or in response to the user command; and
   separate the at least first and second racks,
   wherein the moving means is controllable to open and unfold the at least first and second racks.

4. The mobile rack of claim 3, further comprising:
   a UHF antenna configured to transmit a radio frequency (RF) signal of UHF band generated by the RFID reader and transmit an RF signal of UHF band received from the RFID tag to the RFID reader; and
   a plurality of divisional plates configured to secure the books by dividing the at least first and second racks, each of the divisional plates provided with the UHF antenna in order to divide a stacking area of the books.

5. The mobile rack of claim 3, further comprising an obstacle detecting sensor configured to detect whether any obstacle is between the at least first and second racks and to transmit obstacle detection information to the controller.

6. The mobile rack of claim 5, wherein the controller is further configured to stop movement of the moving means if the obstacle detection information received from the obstacle detection sensor indicates that there is an obstacle between the at least first and second racks.

7. The mobile rack of claim 5, further comprising a display configured to display at least the tag information, the user command or the obstacle detection information.

8. The mobile rack of claim 1, further comprising an obstacle detecting sensor configured to detect whether any obstacle is between the at least first and second racks and to transmit obstacle detection information to the controller.

9. The mobile rack of claim 8, wherein the controller is further configured to stop movement of the moving means if the obstacle detection information received from the obstacle detection sensor indicates that there is an obstacle between the at least first and second racks.

10. The mobile rack of claim 8, further comprising a display configured to display at least the tag information, the user command or the obstacle detection information.

11. A mobile rack for a library, the mobile terminal comprising:
 a plurality of racks configured to hold books, each of the plurality of racks having an RFID tag attached and an RFID reader mounted for recognizing tag information stored in the RFID tag;
 moving means configured to move at least one of the plurality of racks;
 a server configured to manage books that are input, output and stacked; and
 a locking device configured to lock at least two adjacent racks of the plurality of racks while the at least two adjacent racks are approached in response to a user command received via the server or in response to the tag information.

12. The mobile rack of claim 11, wherein:
 the locking device is further configured to release the locked at least two adjacent racks in response to the user command or in response to the tag information; and
 a space between the at least two adjacent racks can be increased or decreased.

* * * * *